United States Patent [19]

Hood

[11] Patent Number: 4,976,658
[45] Date of Patent: Dec. 11, 1990

[54] VARIABLE SPEED TRANSMISSIONS

[76] Inventor: James E. Hood, 10618 Durland Ave., NE., Seattle, Wash. 98125

[21] Appl. No.: 431,486

[22] Filed: Nov. 3, 1989

[51] Int. Cl.⁵ .......................... F16H 9/02; F16H 35/02
[52] U.S. Cl. ..................................... 474/49; 474/101; 474/116; 74/393; 74/396; 280/236
[58] Field of Search ..................................... 474/77–80, 474/101, 113, 116, 49, 50; 74/393, 396, 63; 280/200, 210, 236, 238, 259, 260

[56] References Cited

U.S. PATENT DOCUMENTS

| | | | |
|---|---|---|---|
| 1,872,636 | 8/1932 | Greening et al. | 74/63 |
| 3,956,944 | 5/1976 | Tompkins | 474/50 |
| 4,129,044 | 12/1978 | Erickson et al. | 280/236 |
| 4,493,678 | 1/1985 | Husted | 474/164 |
| 4,735,430 | 4/1988 | Tomkinson | 280/236 |

FOREIGN PATENT DOCUMENTS 439540 12/1935 United Kingdom ................ 280/236

Primary Examiner—Ramon S. Britts
Assistant Examiner—Ezio DiSante
Attorney, Agent, or Firm—Delbert J. Barnard

[57] ABSTRACT

A transmission wheel (12) is shiftable in position radially relative to a driven member such as a bicycle wheel. A driving force is imposed to the transmission wheel (12). This driving force rotates the transmission wheel (12) and the rotational force is transmitted by drive spokes (106) from the transmission wheel (12) to a hub portion of a driven member. The radial adjustment of the transmission wheel (12) relative to the driven member changes the length of a torque arm (106, 130) which in turn changes the drive speed of the driven member. The torque arm length is the radial distance between the rotational axis (40) of the driven member and the location of drive force application onto the transmission wheel (12).

17 Claims, 4 Drawing Sheets

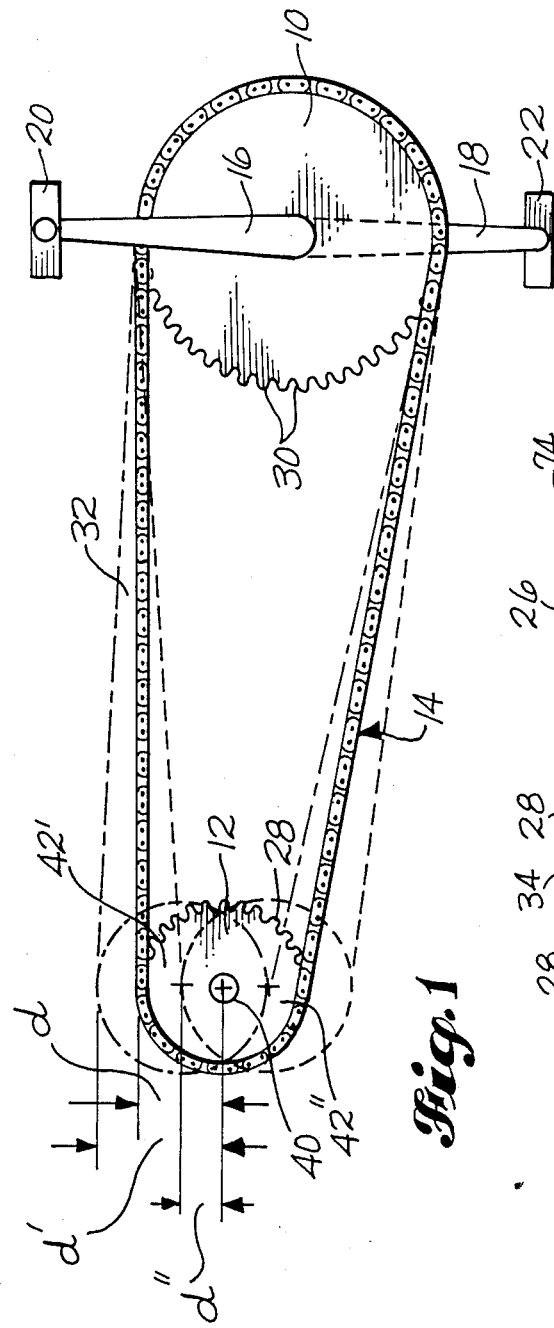
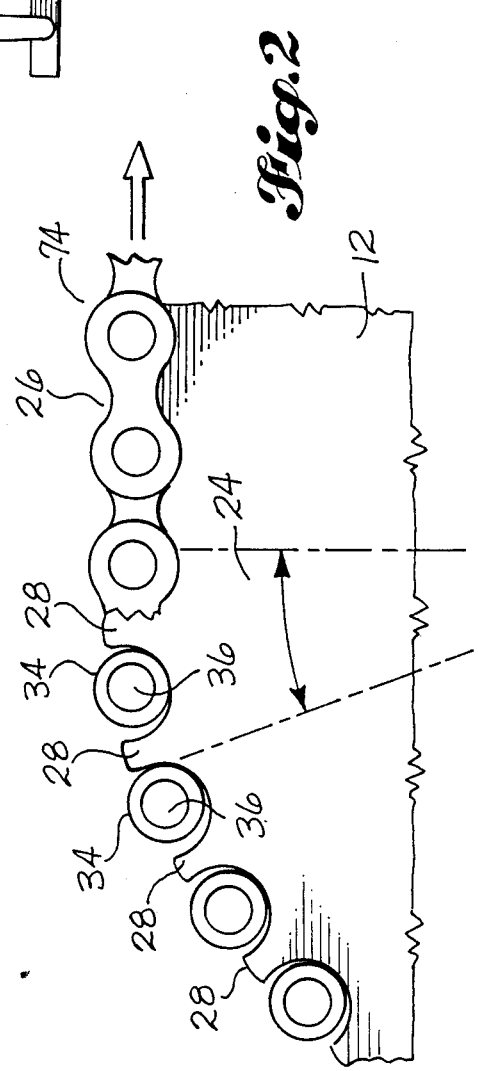

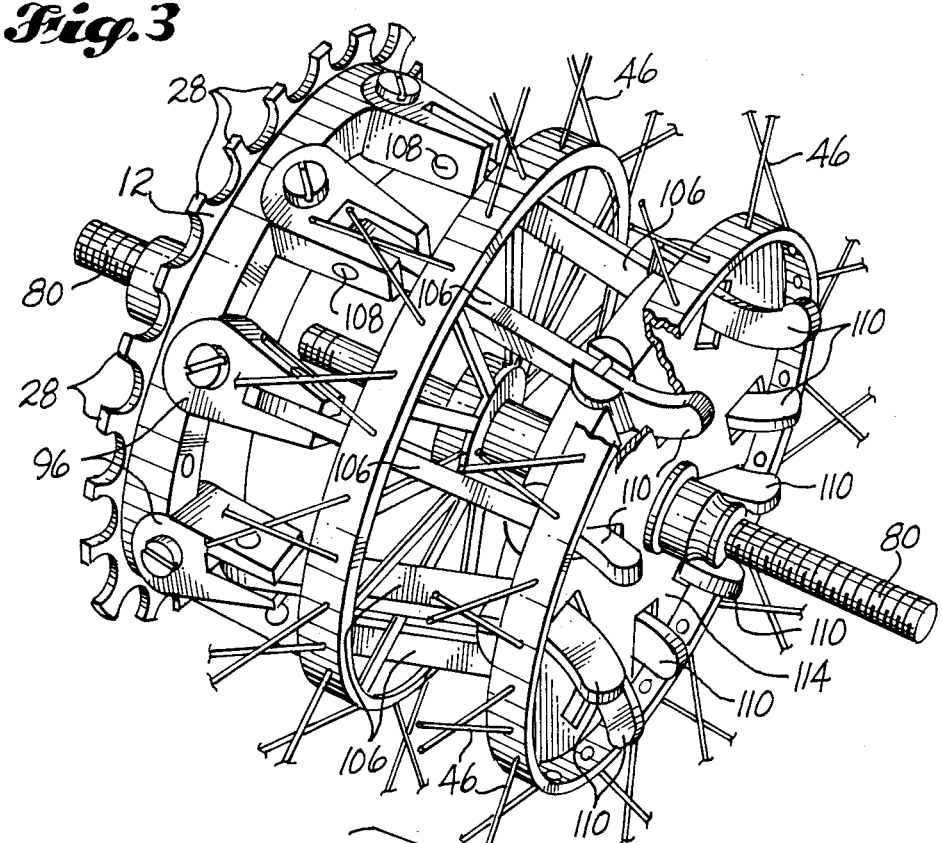
Fig. 3
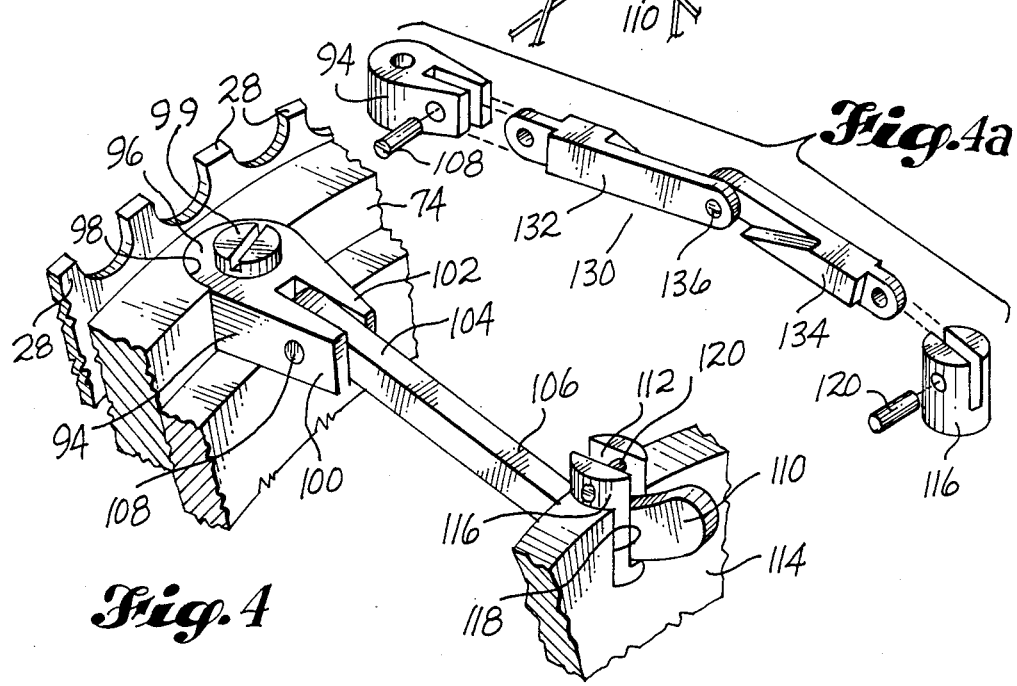
Fig. 4a
Fig. 4

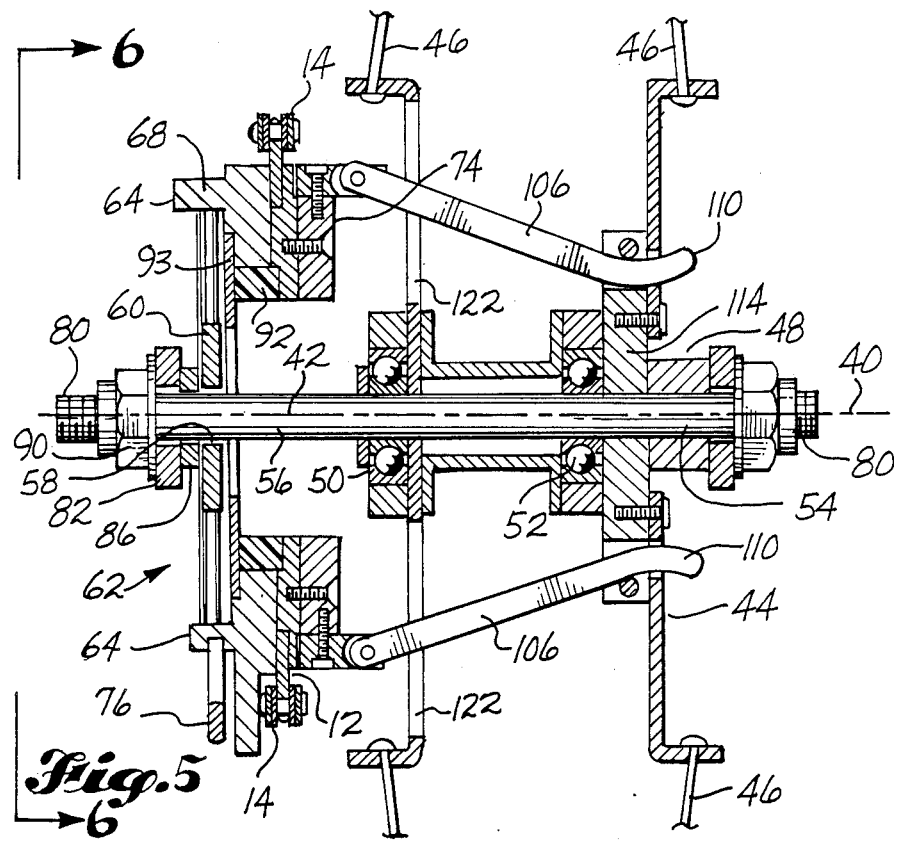
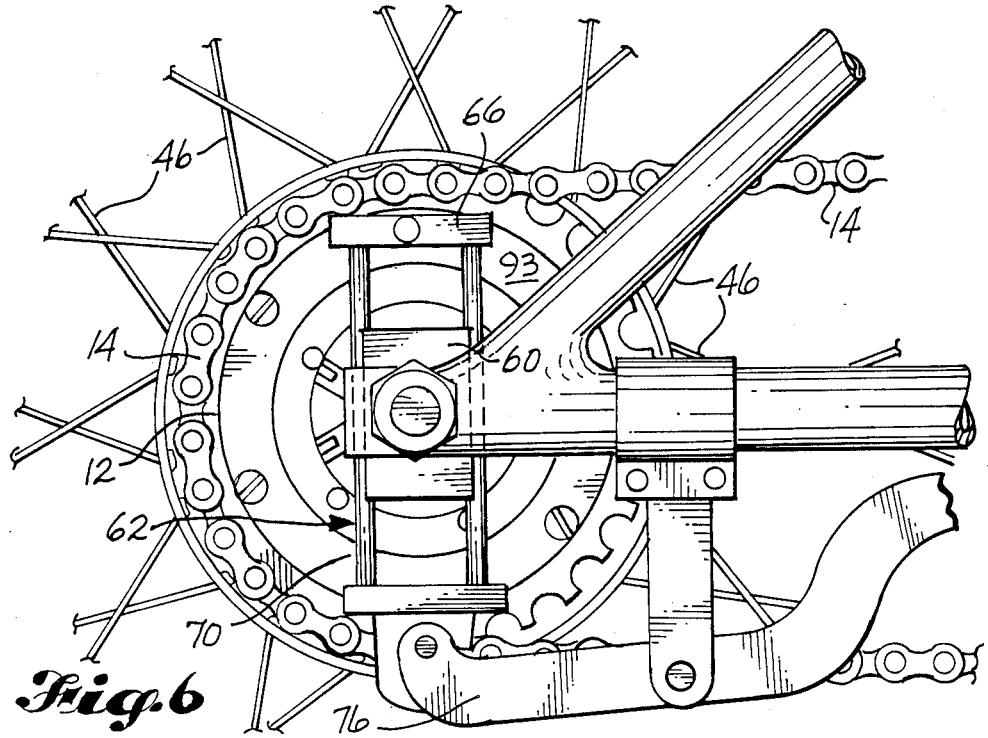

VARIABLE SPEED TRANSMISSIONS

DESCRIPTION

1. Technical Field

This invention relates to variable speed transmissions. More particularly, it relates to the provision of a variable speed transmission in which speed changes are caused by a simple radial position adjustment of a transmission wheel (e.g. a sprocket) relative to the axis of a driven member (e.g. a ground engaging wheel) to which it is coupled by an array of changing length drive spokes which transmit torque from the transmission wheel to the driver member.

2. Background Information

The variable speed transmissions of the present invention were developed for use on bicycles. However, the invention is not limited to such use but rather have a more general utility. It can be used in other vehicles or in stationary machinery.

Multiple speed bicycles are quite popular. A typical multiple speed bicycle has a plurality of different diameter front sprockets which are connected to and driven by foot pedal carrying crank arms, a plurality of different diameter rear sprockets which are connected to the rear wheel, and a drive chain which is shifted from sprocket to sprocket both front and rear to provide different combinations of front and rear sprockets.

The principal object of the present invention is to provide a variable speed transmission comprising a single driving sprocket, a single driven sprocket, and a drive chain which is always in engagement with both of these sprockets. The driven sprocket is shifted in position radially to change the position of its rotational axis relative to the rotational axis of the wheel or other driven member to which the driven sprocket is drivingly connected. This movement of the driven sprocket changes the radial distance between the axis of rotation of the driven member and the upper region of the driven sprocket which receives the driving force imposed by the chain.

Another object of the invention is to provide a variable speed transmission of the type described which is adapted for use in bicycles, for transmitting a variable speed driving force from a single forward foot pedal driven sprocket to a single rearward sprocket that is drivingly connected to the rear wheel of the bicycle.

A further object of the invention is to provide a simplified transmission having general utility which comprises a transmission wheel, which is rotatably driven in any manner and which is movable in position radially relative to the axis of a driven member, and which is drivingly connected to the driven member by adjustable length drive spokes.

DISCLOSURE OF THE INVENTION

The variable speed transmission of this invention is for use with a driven member having a driven member axis. According to the invention, a transmission wheel is positioned axially adjacent the driven member. The transmission wheel includes a transmission wheel axis which extends parallel to the driven member axis. A positioning yoke is provided adjacent the transmission wheel. The transmission wheel is supported on the positioning yoke for rotation about the transmission wheel axis relative to the positioning yoke. The positioning yoke is supported and guided for translation in a yoke plane which is perpendicular to the driven member axis. Translation of the positioning yoke varies the distance between the driven member axis and the transmission wheel axis. Adjustable length drive spokes drivingly connect the transmission wheel to the driven member. In use, the positioning yoke is positioned to establish a desired amount of offset of the transmission wheel axis from the driven member axis. A driving force is imposed on the transmission wheel to in that manner rotate the transmission wheel about the transmission wheel axis. The rotation of the transmission wheel rotates the drive spokes and the drive spokes transmit the rotation of the transmission wheel to the driven member. This causes the driven member to rotate about the driven member axis.

The position of the yoke may be adjusted to make the transmission wheel axis coincide with the driven member axis. This establishes an intermediate drive speed. Repositioning of the positioning yoke to raise the transmission wheel axis above the driven member axis will decrease the drive speed and increase the drive torque. A repositioning of the positioning yoke to move the transmission wheel axis below the driven member axis will increase the drive speed and decrease the drive torque.

In preferred form, an axle extends axially from the driven member and has a center axis which coincides with the driven member axis. The positioning yoke includes a guideway which is elongated in the direction of translation of the positioning yoke. It also includes a guide member which is engaged by the guidway. The axle extends through the guide member and the guide member is fixed in position on the axle and extends perpendicular to the axle. The engagement of the guideway and the guide member function to maintain the yoke and the yoke plane perpendicular in position relative to the axle and the driven member axis. The sliding of the guideway in position relative to the guide member when the positioning yoke is translated changes the position of the transmission wheel axis relative to the driven member axis while maintaining the transmission wheel axis parallel to the driven member axis.

By way of example, the adjustable length drive spokes may each be a single continuous member which is pivotally attached at a first end to a transmission wheel, for pivotal movement within a radial plane, and at its second end extends through a slot carried by the driven member. Or, also by way of example, each drive spoke may be in two parts. The first part may have an inner end pivotally connected to the driven member and an outer end. The second part may have an inner end pivotally connected to the outer end of the first part and an outer end pivotally connected to the transmission wheel. The pivot axes may extend substantially perpendicular to a radial plane so that the two parts of each drive spoke can bend together and apart within a substantial radial plane as the drive spokes rotate about the driven member axis.

Other more detailed features of the inventions are described in the description of the preferred embodiment and are particularly pointed out in the appended claims.

BRIEF DESCRIPTION OF THE DRAWING

In the drawings, like element designations refer to like parts throughout, and:

FIG. 1 is a side elevational view of a chain and sprocket drive for a bicycle, showing a range of vertical movement of the rear sprocket relative to the rear wheel hub, for purposes of changing speed, but omitting the structure for effecting the movement and drivingly connecting the rear sprocket to the wheel hub;

FIG. 2 is an enlarged scale fragmentary view of the upper portion of the rear sprocket showing the region in which the drive chain engages the sprocket teeth and imparts a driving force against said teeth;

FIG. 3 is a pictorial view of the hub region of the rear wheel of a bicycle that is equipped with the variable speed chain and sprocket drive of the invention, with the drive chain omitted and showing inner end portions only of the wheel spokes;

FIG. 4 is an enlarged scale fragmentary pictorial view in the region of a drive spoke;

FIG. 4a is a view like FIG. 4 showing a modified construction of the drive spoke;

FIG. 5 is an axial sectional view taken through the rear wheel hub and the rear sprocket assembly;

FIG. 6 is a side elevational view taken substantially along line 6—6 of FIG. 5;

BEST MODE FOR CARRYING OUT THE INVENTION

Figure 7:
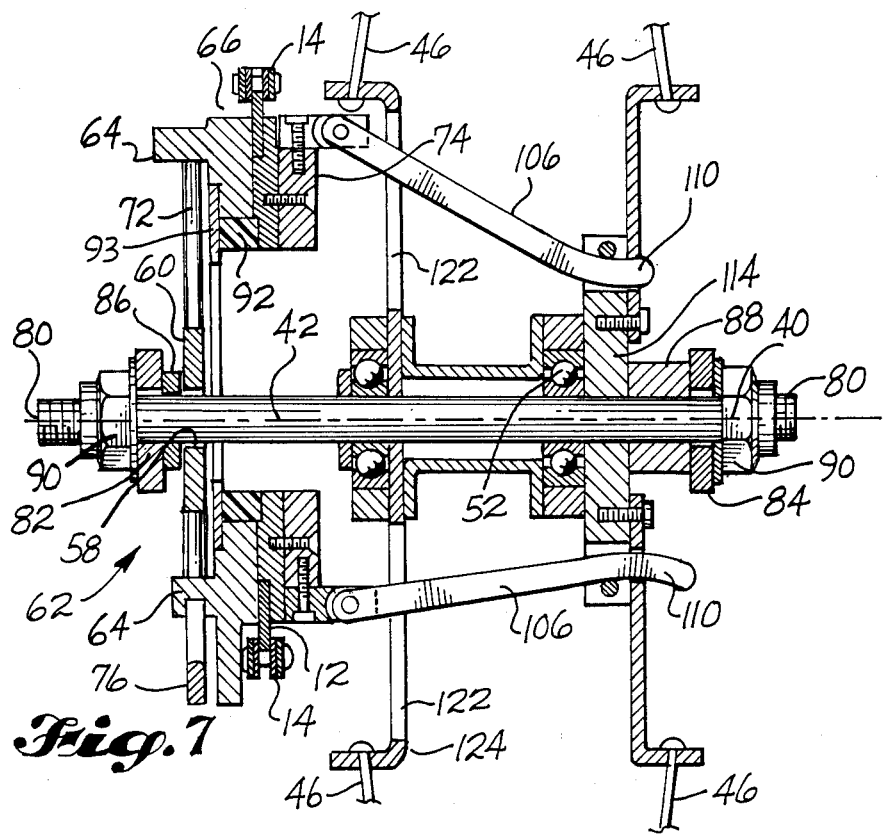
FIG. 7 is a view like FIG. 5, but showing the rear sprocket shifted upwardly from the position shown in FIGS. 5 and 6.
Figure 8:
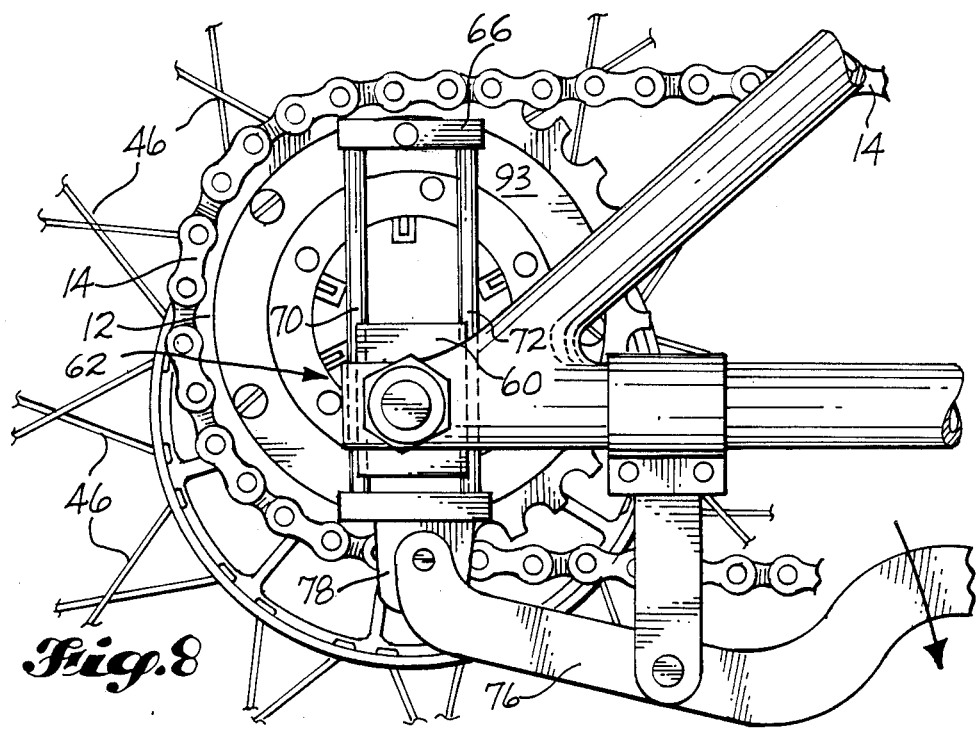
FIG. 8 is a view like FIG. 6, but showing the rear sprocket positioned upwardly in the position shown by FIG. 7.

FIGS. 1 and 2 illustrate the basic principles upon which the variable speed transmissions of the invention operate. FIG. 1 shows a bicycle drive comprising a front sprocket 10, a smaller rear sprocket 12, and an interconnecting drive chain 14. A pair of conventional crank arms 16, 18 are attached to the sprocket 10. Crank arms 16, 18 include foot receiving pedals 20, 22 at their outer ends. As is well-known, the bicycle rider places his or her feet on the pedals 20, 22 and as each pedal 20, 22 reaches an upper position it is pushed forwardly and downwardly by foot pressure to impart a driving force to its crank arm 16, 18 to in turn rotatively drive the front sprocket 10. The rotating sprocket 10 in turn drives the upper run of drive chain 14 forwardly. Within an upper narrow annular region 24 of the rear sprocket 12 the drive chain 14 engages and imposes a driving force on sprocket teeth 28.

As shown by FIG. 1, sprocket teeth 28 are at the periphery of the rear sprocket wheel 12. Front sprocket wheel 10 includes sprocket teeth 30 at its periphery. The teeth 30 pull on the upper run 32 of chain 14. Elements 34 carried by chain pins 36 contact the trailing generally radial surface portions of the sprocket teeth 28 and impart the chain force on the teeth 28, causing rotation of sprocket wheel 12.

FIG. 1 shows the forward sprocket wheel 10 to be larger in diameter than the rearward sprocket wheel 12. Wheel 10 has more teeth than wheel 12 and so for each revolution of sprocket 10 the sprocket 12 will rotate more than one revolution.

In FIG. 1, the rear sprocket or transmission wheel 12 is shown to be radially shiftable in position relative to axis 40. Axis 40 is the axis of rotation of a rear wheel of a bicycle or some other driven member. FIG. 1 includes a solid line showing the rear sprocket 12 positioned with its axis of rotation 42 coinciding with the axis of rotation 40. In FIG. 1, the axis 42 is also shown shifted vertically upwardly into a position 42'. It is further shown shifted vertically downwardly into a third position 42". The mechanism for supporting and shifting the wheel or sprocket 12 in position will hereinafter be described.

As stated above, the rotation causing force of the chain 14 is applied on the teeth 28 of sprocket 12 within a relatively narrow angular region 24. The speed of rotation and the rotational torque are determined by the radial distance between axis 40 and the location where the elements 34 make drive imposing contact with the teeth 28. When transmission wheel axis 42 coincides with driven member axis 40, this distance is d. When axis 42 is shifted upwardly to position 42' the radial distance between driven member axis 40 and the location of drive impact with teeth 28 is a larger distance d'. When transmission wheel axis 42 is lowered to position 42" the torque arm distance is reduced to d". When transmission wheel axis 42 coincides with driven member axis 40, the drive speed is an intermediate speed. Adjustment in position of the transmission wheel 12 in the upward direction reduces the drive speed and increases the drive torque. Adjustment in position of transmission wheel 12 downwardly increases the drive speed and decreases the drive torque. If, for example, the lowest speed chosen is the lowest speed of a conventional ten speed bicycle, and the highest speed chosen is the highest speed of such a ten speed conventional bicycle, the transmission of the invention can provide an essentially infinite number of speed changes between the highest and lowest speeds of a conventional ten speed bicycle. This can be accomplished by a simple shifting in position of the rear sprocket of the transmission, without any transfer of the drive chain from sprocket to sprocket at either one or both ends of the transmission, as is necessary during operation of the transmission of a conventional ten speed bicycle.

A first embodiment of the mechanism for adjusting the position of wheel 12 and imparting drive from wheel 12 to a driven member will now be described in connection with FIGS. 3-8. In this embodiment the driven member is a bicycle wheel having a hub 44. A plurality of wheel spokes 46 extend generally radially outwardly to a rim (not shown) in a conventional manner. Hub 44 includes a center structure 48 which includes bearings 50, 52 surrounding an axle 54. The bearings 50, 52 mount the wheel hub 44 and the rest of the wheel for rotation about the axle 54. The wheel is within a wheel plane and the axle 54 extends perpendicular to the wheel plane. Axle 54 has a center axis which coincides with axis 40. Axle 54 includes an end portion 56 extends axially endwise of the hub 44. End portion 56 extends to and through an opening 58 in a guide member 60. Guide member 60 is in a plane which is always parallel to the wheel plane and perpendicular to axis 40. Guide member 60 is engaged by a guideway 62. Guideway 62 has a lower portion 64, and an upper portion 66 which are portions of a ring-like member 68. Guideway 62 may include a pair of parallel rods 70, 72. Guide member 60 may have vertical grooves formed in its side edges which substantially conform in curvature to the rods 70, 72 and into which inner side portions of the rods 70, 72 are received. This engagement between the guide member 60 and the rods 70, 72 permits relative movement between the member 60 and the rods 70, 72 in a direction parallel to the rods 70, 72, while restraining essentially all other movement between member 60 and rods 70, 72. A second ring member 74 is mounted on ring member 68 via bearing means 92, 93. Ring member 74 carries the rear sprocket 12 which in embodiment shown by FIGS. 3-8 is annular in form.

In the embodiment shown by FIGS. 3-8, the sprocket 12 and its support ring 74 constitute a transmission wheel. Since member 12 is a sprocket, it includes sprocket teeth 28 at its outer periphery. In other embodiments, involving a different type of transmission wheel, the rotary drive may be transmitted to the transmission wheel in some other way than by an engagement of peripheral teeth with a drive chain.

As shown by FIG. 6, a push-pull control member 78 is shown to be connected to a lever 76. An upward movement of the control member 78 will cause an upward movement of the guideway relative to the slide member 60. The transmission wheel or sprocket 12 moves upwardly with the guideway, while remaining perpendicular to the axle 54 and the driven member axis 40. In similar fashion, a downward movement of the control member 78 will cause a downward movement of the guideway. At the same time, there is a downward movement of the transmission wheel or sprocket 12. Again, the wheel 12 remains perpendicular to the driven member axis 40 as it moves.

Referring to FIGS. 5-8, the axle 54 is shown to be threaded at each of its ends, at 80. The rear wheel assembly is positioned between rear frame parts 82, 84, with end portions of the axle 54 received within openings in frame parts 82, 84, in a known manner. Spacers 86, 88 may be placed inwardly of the frame parts 82, 84. The threaded portions 80 of the axle receive securement nuts 90.

Ring 68 is stationary as to rotation only. Ring 74 to which sprocket 12 is connected rotates and is supported for rotation by a bearing 92, 93. As best shown by FIGS. 3, and 4, ring 74 carries a circular array of clevises 94 (e.g. nine). Each clevis 94 includes a mounting end portion 96 which fits into a socket 98. End portions 96 and sockets 98 have complementary side surfaces of circular curvature centered at the center of an opening in the clevis 94 which receives a mounting screw 99. Clevis 94 a pair of tines 100, 102 which project from portion 96. A first end portion 104 of a drive spoke 106 fits between the tines 100, 102 and is connected to the tines 100, 102 by a pivot pin 108. The tines 100, 102 and the drive spokes 106 are all located in radial planes. Nine spokes 106 are shown in FIG. 3. Each drive spoke 106 is able to pivot up and down within its plane about its pin 108. The second or opposite ends 110 of the drive spokes 106 are noncircular in cross section (FIGS. 3 and 4) and fit within slots 112 which are a part of hub wall 114. In the illustrated embodiment, the slots 112 are formed in cylindrical bearings 116 which are received and retained in cylindrical sockets 118 formed in hub wall 114. The sockets 118 and the bearings 116 extend radially. The outer end portion of each bearing 116 may include a cross pin 120 which serves as an outer end closure for the slot 112. Drive spoke end portions 110 snugly fit within the slots 112 but are able to move up and down and in and out. The clevises 94 are able to rotate a slight amount about the axis of the mounting screws 99. The bearings 116 are also able to rotate a slight amount within the sockets 118.

As shown by FIGS. 3, 5 and 7, the drive spokes 106 extend from their first end points of connection to the ring 74 both axially and radially inwardly through slot openings 122 formed in inner hub member 124. Then they extend to and through the slots 112 and a short distance beyond hub wall 114. As can be readily appreciated, the drive spokes 106 rotationally couple ring 74 to hub wall 114 regardless; of the radial position of ring 74 to the wheel axis 40.

As apparent from FIGS. 3 and 4, rotational drive applied to the sprocket 12 by the drive chain 14 will rotate sprocket 12 and ring 74 relative to fixed ring 68. The pivotal connection of drive spokes 106 to ring 74 provided by the clevises 94 will cause a slight pivotal movement of the clevises 94 relative to ring 74 in response to the initial movement of ring 74. The drive spokes 106 will askew slightly and then bind, owing to the connection provided by bearing 116 which will allow only a limited pivotal movement of the slot 112. When the slots 112 reach the end of pivotal movement the drive spokes 106 will form an effective drive link connecting driving member 94 to driven member 114.

FIG. 5 shows transmission wheel axis 42 coinciding with hub axis 40. In this condition the nine drive spokes 106 are substantially symetrically positioned about the axes 40, 42. FIG. 7 shows the rear sprocket 12 repositioned to place its axis of rotation 42 above wheel axis 40. In this position the spokes 106 pivot radially between the two positions shown in FIG. 7 as the array of drive spokes 106 rotate about the wheel axis 40. However, as they rotate, the drive spokes 106 continue to transmit a rotational drive between sprocket 12 and the hub 44.

In use, the ring 68 is fixed against rotation. Drive chain 14 acts upon sprocket 12, causing sprocket 12 and ring 74 to which it is connected to rotate about axis 42. Ring 74 rotates the drive spokes 106 which in turn impart a rotational drive to the wheel hub 44.

FIG. 4a illustrates a modified form of drive spoke 130. Spokes of this construction may be substituted in place of spokes 106.

In this embodiment, the drive spokes 130 are formed in two parts. Each includes an inner part 132 and an outer part 134. The inner end of part 134 is pivotally attached by a pin 120 to a bearing 116 which is carried by the wheel hub 44. The outer end of part 132 is pivotally attached to part 134 by a pin 136. The outer end of part 134 is pivotally attached by a pin 108 to an element 94 which is carried by ring 74. Elements 94 and 116 are mounted for a limited amount of rotation, as described above.

Each of the articulated spokes 130 are located within a radial plane. The pivot pins 108, 136, 120 extends perpendicular to the radial plane. This allows the spokes to move in position between two extreme positions as they rotate about axis 40. The drive spokes 130 move in scissor fashion within the radial plane, and at their ends rotate a limited amount by rotation of members 94, 116. The drive spokes 130 are essentially restrained against all other movement. As a result, during rotation of ring 74, the drive spokes 130 will impart the rotational drive from ring 74 to the hub 44. Telescopic spokes can be used in some installations.

The embodiments which have been illustrated and described are submitted for example purposes. The scope of protection is not to be limited by these examples but only by the appended claims, interpreted in accordance with established rules of patent claim interpretation, including use of the doctrine of equivalents.

What is claimed is:

1. For use with a driven member which includes a driven member axis, a variable speed transmission, comprising:

a transmission wheel positioned axially adjacent the said driven member and including a transmission wheel axis which extends parallel to said driven member axis;

a positioning yoke for said transmission wheel positioned adjacent the transmission wheel;

means supporting the transmission wheel on said positioning yoke for rotation about said transmission wheel axis relative to the positioning yoke;

means supporting and guiding said positioning yoke for translation in a yoke plane which is perpendicular to the driven member axis, for varying the distance between the driven member axis and the transmission wheel axis; and adjustable length drive spokes drivingly connecting the transmission wheel to said driven member;

wherein in use the positioning yoke is positioned to establish a desired amount of offset of the transmission wheel axis from the driven member axis, and a driving force is imposed on the transmission wheel to in that manner rotate the transmission wheel about the transmission wheel axis, and the rotation of the transmission wheel rotates the drive spokes and the drive spokes transmit the rotation of the transmission wheel to the driven member, causing the driven member to rotate about the driven member axis.

2. A variable speed transmission according to claim 1, wherein each adjustable length drive spoke is a single continuous member which is pivotally attached at a first end to the transmission wheel, for pivotal movement within a radial plane, and at its second end extends through a slot carried by the driven member.

3. A variable speed transmission according to claim 2, comprising a clevis at each first end of each drive spoke, each said clevis including a pair of generally axially extending tines between which the first end of its drive spoke is received, and a pivot pin extending through said tines and the first end of the drive spoke for pivotally connecting the drive spoke to the clevis.

4. A variable speed transmission according to claim 2, wherein said driven member includes a bearing for each drive spoke and said slots are formed in said bearings, and each said bearing is mounted onto the driven member for limited pivotal movement about a radial axis.

5. A variable speed transmission according to claim 4, comprising a clevis at each first end of each drive spoke, each said clevis including a pair of generally axially extending tines between which the first end of its drive spoke is received, and a pivot pin extending through said tines and the first end of the drive spoke for pivotally connecting the drive spoke to the clevis.

6. A variable speed transmission according to claim 1, wherein each said drive spoke is in two parts, with a first part having an inner end pivotally connected to the driven member and an outer end, and a second part having an inner end pivotally connected to the outer end of the first part, and an outer end pivotally connected to the transmission wheel, with the pivot axes extending substantially perpendicular to a radial plane so that the two parts of each drive spoke can bend together and apart within a substantially radial plane as the drive spokes rotate about the driven member axis.

7. A variable speed transmission according to claim 1, wherein said transmission wheel is a sprocket having a periphery and sprocket teeth at said periphery to engage a drive chain.

8. A variable speed transmission according to claim 7, wherein said driven member is a ground engaging wheel.

9. A variable speed transmission according to claim 1, wherein said driven member is a ground engaging wheel.

10. A variable speed transmission according to claim 1, further including an axle extending axially from said driven member and having a center axis which coincides with the driven member axis, wherein said positioning yoke includes a guideway which is elongated in the direction of translation of the positioning yoke, and a guide member is engaged by said guideway, said axle extending through said guide member and said guide member being fixed in position on the axle and extending perpendicular to the axle, with engagement of the guideway and the guide member functioning to maintain the yoke and the yoke plane perpendicular in position relative to the axle and the driven member axis, with the guideway sliding in positioning relative to the guide member when the positioning yoke is translated to change the position of the transmission wheel axis relative to the driven member axis.

11. A variable speed transmission according to claim 10, wherein each adjustable length drive spoke is a single continuous member which is pivotally attached at a first end to the transmission wheel, for pivotal movement within a radial plane, and at its second end extends through the slot carried by the driven member.

12. A variable speed transmission according to claim 11, comprising a clevis at each first end of each drive spoke, each said clevis including a pair of generally axially extending tines between which the first end of its drive spoke is received, and a pivot pin extending through said tines and the first end of the drive spoke for pivotally connecting the drive spoke to the clevis.

13. A variable speed transmission according to claim 11, wherein said driven member includes a bearing for each drive spoke and said slots are formed in said bearings, and each said bearing is mounted onto the driven member for limited pivotal movement about a radial axis.

14. A variable speed transmission according to claim 13, comprising a clevis at each first end of each drive spoke, each said clevis including a pair of generally axially extending tines between which the first end of its drive spoke is received, and a pivot pin extending through said tines and the first end of the drive spoke for pivotally connecting the drive spoke to the clevis.

15. A variable speed transmission according to claim 10, wherein each said drive spoke is in two parts, with a first part having an inner end pivotally connected to the driven member and an outer end, and a second part having an inner end pivotally connected to the outer end of the first part, and an outer end pivotally connected to the transmission wheel, with the pivot axes extending substantially perpendicular to a radial plane so that the two parts of each drive spoke can bend together and apart within a substantially radial plane as the drive spokes rotate about the driven member axis.

16. A variable speed chain sprocket drive, comprising:

a first sprocket mounted for rotation about a drive axis and including a periphery and drive teeth at the periphery;

a wheel spaced from said first sprocket, said wheel including a hub having first and second ends and a center portion, a wheel axis about which said hub and wheel rotate, and a wheel plane extending perpendicular to said wheel axis, said wheel being located within said wheel plane;

a second sprocket positioned outwardly adjacent the first end of said hub, said second sprocket comprising a periphery, drive teeth at the periphery, and a second sprocket axis parallel to both the wheel axis and the drive axis;

a drive chain interconnecting the first and second sprockets and including drive links engaging the teeth of said sprockets;

a positioning yoke for said second sprocket positioned adjacent the second sprocket;

means supporting the second sprocket on said positioning yoke for rotation relative to the postioning yoke about said second sprocket axis;

means supporting and guiding the positioning yoke for translation in a yoke plane that is parallel with the wheel plane, for varying the distance between the wheel axis and the second sprocket axis;

a drive spoke assembly drivingly connecting the second sprocket to the hub, said assembly comprising a circular array of drive spokes, said drive spokes having first ends which are pivotally connected to the second sprocket, for pivotal movement relative to the second sprocket within a radial plane, and having opposite end portions which are noncircular in cross-section;

said hub including means defining drive slots equal in number to said drive spokes, spaced about said wheel axis, said drive slots being dimensioned to receive said opposite end portions of the drive spokes;

said opposite end portions of said drive spokes extending into said drive slots and in the width direction snuggly fitting within said drive slots; and wherein in use the positioning yoke is positioned to establish a desired amount of offset of the second sprocket axis from the wheel axis, and the first sprocket is rotated to move the chain and the chain in turn rotates the second sprocket about the second sprocket axis, and the second sprocket rotates the drive spoke assembly and the drive spoke transmits the rotation of the second sprocket to the hub, causing the hub and wheel to rotate about the wheel axis, with the drive spokes pivoting in position relative to the second sprocket and sliding in position within the drive slots as they rotate around the wheel axis.

17. A drive according to claim 16, further including an axle extending through the center portion of said hub, said axle having a center axis which coincides with the wheel axis, said axle including an axle end portion which projects outwardly from the first end of the hub;

wherein said positioning yoke includes a guideway which is elongated in the direction of translation of the positioning yoke, and a guide member is engaged by said guideway, said axle extending through said guide member and said guide member being fixed in position on the axle and extending perpendicular to the axle, with engagement of the guideway and the guide member functioning to maintain the yoke and the yoke plane perpendicular in position relative to the axle and the wheel axis, with the guideway sliding in position relative to the guide member when the positioning yoke is translated to change the position of the second sprocket relative to the wheel hub.

* * * * *